United States Patent [19]

Mann

[11] 3,941,096

[45] Mar. 2, 1976

[54] COMBINATION INSECTICIDE APPLICATOR AND FEEDER

[76] Inventor: Fred W. Mann, P.O. Box 444, Waterville, Kans. 66548

[22] Filed: Aug. 19, 1974

[21] Appl. No.: 498,744

Related U.S. Application Data

[63] Continuation-in-part of Ser. No. 452,422, March 18, 1974, abandoned.

[52] U.S. Cl. .............................................. 119/159
[51] Int. Cl.² ......................................... A01K 29/00
[58] Field of Search ........................... 119/159, 157

[56] References Cited
UNITED STATES PATENTS

3,187,722  6/1965  Gilmore et al. .................... 119/157

*Primary Examiner*—Hugh R. Chamblee
*Attorney, Agent, or Firm*—Fishburn, Gold & Litman

[57] ABSTRACT

An insecticide applicator for applying insecticide material to at least the face, head, and neck area of livestock includes a hood supported at a selected position above a ground surface and covering a cage supporting a livestock attracting material, such as a mineral block, and surrounded by an insecticide material dispensing device. The cage supports a lower surface of the livestock attracting material at a position above a bottom portion of the insecticide dispensing device whereby livestock must activate the insecticide material dispensing device to reach and have access to the livestock attracting material in the cage.

19 Claims, 10 Drawing Figures

COMBINATION INSECTICIDE APPLICATOR AND FEEDER

This is a continuation-in-part of my application Ser. No. 452,422 filed Mar. 18, 1974 and now abandoned.

The present invention relates to insecticide applicators for livestock and more particularly to such an insecticide applicator which has a hood supported at a selected position above a ground surface and covering a cage supporting a livestock attracting material and surrounded by an insecticide material dispensing device which will be activated by livestock reaching to have access to the livestock attracting material in the cage.

The principal objects of the present invention are: to provide an insecticide applicator for applying an insecticide material to at least the face, head, and neck area of livestock when the livestock is reaching for a livestock attracting material in a cage; to provide such an insecticide applicator which will cause livestock to reach upwardly to lick at a bottom of a material block, such as salt or the like, and while doing so the livestock is forced to come into full and wide contact about face, neck and head areas with an insecticide material applying means; to provide such an insecticide applicator including means to adjust spacing between a bottom of a mineral block and a bottom portion of an insecticide material dispensing device; and to provide such an insecticide applicator which is economical to manufacture, sturdy in use, durable in construction, positive in operation, and particularly well adapted for the purposed use.

Other objects and advantages of this invention will become apparent from the following description taken in connection with the accompanying drawings wherein are set forth, by way of illustration and example, certain embodiments of this invention.

The drawings constitute a part of the specification and include an exemplary embodiment of the present invention and illustrate various objects and features of the insecticide applicator.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Figure 1:
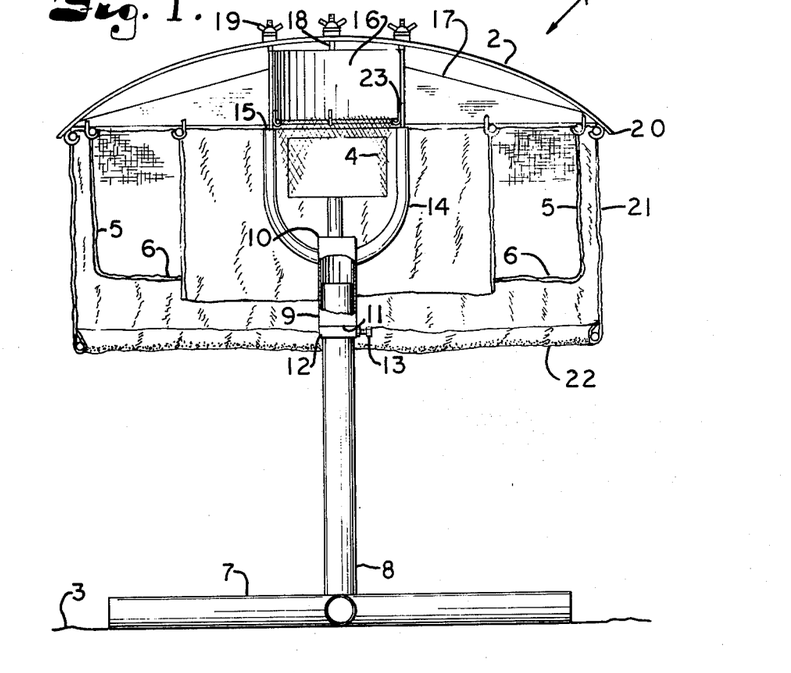
FIG. 1 is a side elevational view of an insecticide applicator embodying features of the present invention and shown with portions broken away to better illustrate component parts thereof.
Figure 2:
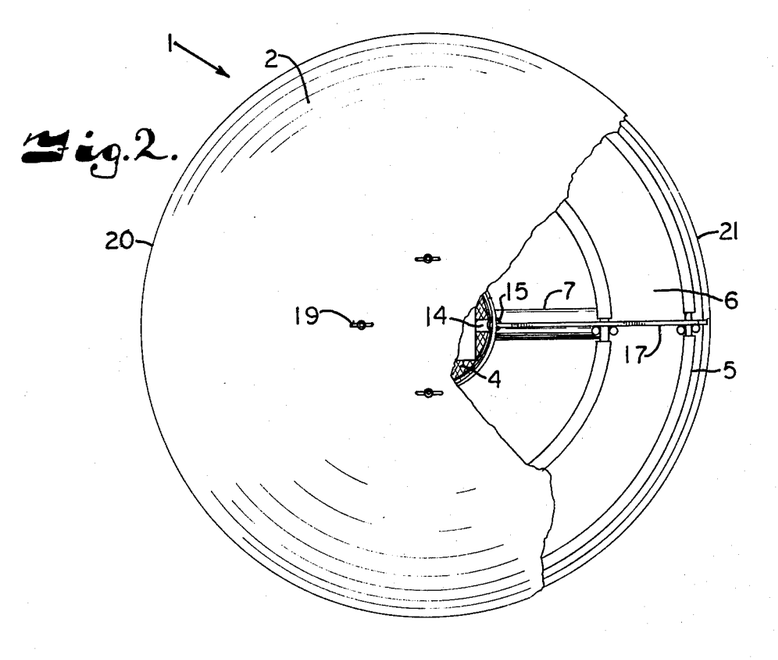
FIG. 2 is a top plan view of the insecticide applicator with portions broken away to better illustrate component parts thereof.

In the disclosed embodiment of the present invention, the reference numeral 1 generally designates an insecticide applicator for applying an insecticide material to at least the face, head, and neck area of livestock. The insecticide applicator 1 includes a hood 2 supported at a selected position above a ground or support surface 3 and covering a cage or basket 4 supporting a livestock attracting material, such as a mineral block or the like, and surrounded by insecticide material dispensing means 5. The cage 4 supports a lower surface of the livestock attracting material at a position above a bottom portion 6 of the insecticide material dispensing means 5 whereby livestock must engage and activate the insecticide material dispensing means 5 to reach and have access to the livestock attracting material in the basket or cage 4.

In the illustrated structure, the hood 2 is mounted on a support structure which has a base 7 and an upright member 8 extending upwardly therefrom. The illustrated base is formed of a plurality of circumferentially spaced arms in engagement with the ground or support surface 3 and the upright member 5 extends upwardly from the center of the base 7. The base 7 may be secured or anchored to the ground or a support surface 3 in any desired manner.

The hood 2 and the upright member 8 have cooperating means thereon to support the hood 2 at a selected position above the support or ground surface 3. In the illustrated structure, a sleeve 9 is mounted on and movable longitudinally of the upright member 8 and the sleeve 9 has an upper end 10 and a lower end 11. A collar 12 is mounted on the upright member 8 and includes suitable means to secure the collar 12 in a selected position below the sleeve 9 whereby the collar 12 will be engaged by the lower end 11 of the sleeve 9 and thereby support the sleeve 9 on the collar 12. In the illustrated structure, one or more set screws 13 are mounted on the collar and adapted to engage the upright member 8 to secure the collar 12 at a selected position along the upright member 8.

A plurality of circumferentially spaced arms 14 extend upwardly and outwardly from the sleeve 9 and each of the arms 14 has a lower end thereof suitably secured to the sleeve 9 adjacent the upper end 10 of the sleeve 9, as by welding. The arms 14 extend in an arcuate path outwardly and upwardly from the sleeve 9 and terminate at an upper end 15. The arms 14 are circumferentially spaced around the sleeve 9 and spaced at a distance sufficient to permit a head of livestock to extend therebetween. The arms 14 also each have an upper portion thereof positioned adjacent the insecticide dispensing means or container 5.

A wall member 16 is positioned above the arms 14 and is suitably secured to the upper ends 15 of the arms 14 to thereby define a substantially cylindrical space within the wall member 16. The wall member 16 provides support for a plurality of circumferentially spaced and radially extending support members 17 which each have one end suitably secured to the wall member 16, as by welding, and the support members 17 extend outwardly therefrom. The support members 17 each have an upper edge having a shape conforming to the shape of the lower surface of the hood 2 whereby the hood may be supported thereon.

Suitable means are secured to the wall member 16 and are engageable with the hood 2 for holding same in engagement with the wall member 16 and in engagement with the support members 17. In the illustrated structure, a plurality of studs 18 are secured to and extend upwardly from the wall member 16 and extend through suitable apertures in the hood 2. The upper end portion of each of the studs 18 are threaded and adapted to receive suitable fastening devices, such as wing nuts 19, which are adapted to hold the hood in clamped engagement with the wall member 16 and the support members 17. Suitable weatherproof washers or gaskets surround the studs 18 and are engaged by the wing nuts 19 thereby providing a weather seal.

The hood 2 may have any desired shape and is preferably higher at the center than at peripheral edge or edges 20 which are spaced outwardly from the upright member 8. The hood 2 is illustrated as being dome-shaped. The hood 2 is formed of any suitable waterproof material, such as metal, plastic, or the like, and is adapted to shed moisture including water, snow and the like from the insecticide applicator 1.

The insecticide dispensing means 5 depend from the hood 2 or from the support members 17 supporting same and the insecticide dispensing means 5 surrounds the upright member 8 to thereby dispense insecticide material onto livestock in response to engagement of the bottom portion 6 of the insecticide material dispensing means 5 by the livestock. The insecticide material dispensing means 5 is positioned between the upright member 8 and the peripheral edge 20 of the hood 2. While a container formed of flexible and porous fabric is illustrated, it is to be understood that the insecticide dispensing means 5 may be any suitable device to dispense insecticide dust or liquid in response to activation, as by agitation thereof by livestock, such as engagement with a bottom portion of the respective device.

Particularly when salt is used as the livestock attracting material, it is desirable to provide sufficient space between the salt block and the insecticide dispensing means 5 thereby substantially avoiding contact between the porous fabric and the salt. The livestock, therefore, will not receive salt from the porous fabric of the container 5 and thereby will avoid contact with salt about the eyes and face thereof.

The side of the container 5 facing the salt block or livestock attracting material may be formed of a nonporous material or canvas to prevent salt from entering the container and thereby being applied to the face of the livestock. The non-porous material or canvas may depend from the bottom portion 6 of the container 5 to form a drip ring and shield the salt block from moisture in the form of rain, snow and the like.

It is desirable to provide weather protection for the insecticide dispensing means 5, therefore, a flexible weather shield 21 depends from the peripheral edge 20 of the hood 2 and the weather shield 21 surrounds the insecticide material dispensing means 5. The weather shield 21 has a lower edge portion 22 positioned below the bottom portion 6 of the insecticide material dispensing means or container 5. The lower edge portion 22 of the weather shield 21 is illustrated as having a hem with a suitable weight enclosed therein, such as a wire, which will be lifted by the livestock when moving toward the livestock attracting material in the cage or basket 4 whereby the livestock agitates the bottom portion 6 of the insecticide material dispensing means or container 5 thereby activating same to dispense the insecticide material therein.

Means are supported on the upright member 8 and positioned below the hood 2 for supporting and retaining a livestock attracting material at a selected position having a lower surface of the livestock attracting material positioned above the bottom portion 6 of the insecticide material dispensing container or means 5 whereby livestock must engage and activate the insecticide material dispensing container 5 to reach and have access to the livestock attracting material. The insecticide material dispensing container surrounds the cage or basket 4 having the livestock attracting material therein.

In the illustrated structure, the basket or cage 4 is formed of a fabric net having an upper portion thereof supported on the wall member 16, as by a plurality of circumferentially spaced hooks 23 on an interior surface of the wall member 16 and adapted to receive and support a hem on the basket or cage 4. The hem is at the upper edge of the basket or cage 4 and has a suitable stiffening member therein, such as a rod or wire.

The hood 2 is removable by removing the wing nuts 19 thereby providing access to the cage or basket 4 for placing therein the mineral block or the like and for recharging the insecticide material dispensing means 5. When the insecticide applicator 1 is first mounted in an area or yard having livestock therein, it may be necessary to lower the cage or basket 4 to a position where the livestock can see same. After the livestock has established the habit of partaking of the livestock attracting material within the cage or basket 4, the sleeve 9 is raised to a position supporting a bottom or lower surface of the mineral block or livestock attracting material at a position above the bottom portion 6 of the insecticide material dispensing container or means 5. The collar 12 is positioned in engagement with the lower end 11 of the sleeve 9 and the set screw or screws 13 are tightened to support the cage or basket 14 at the selected location.

Figure 3:
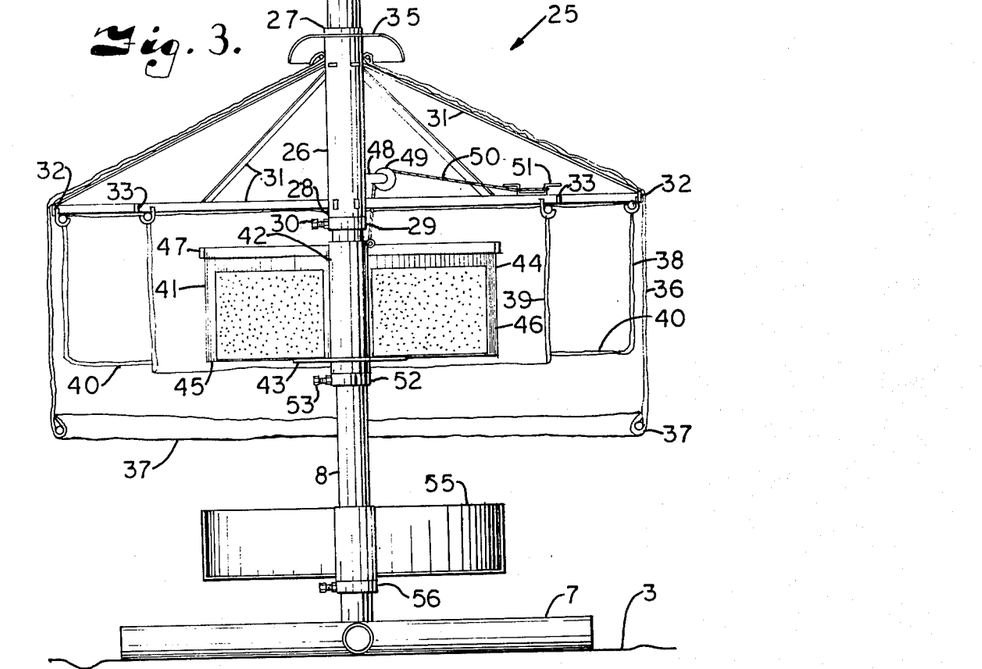
FIG. 3 is a side elevational view of an other form of insecticide applicator and with portions broken away to better show the component parts thereof.
Figure 4:
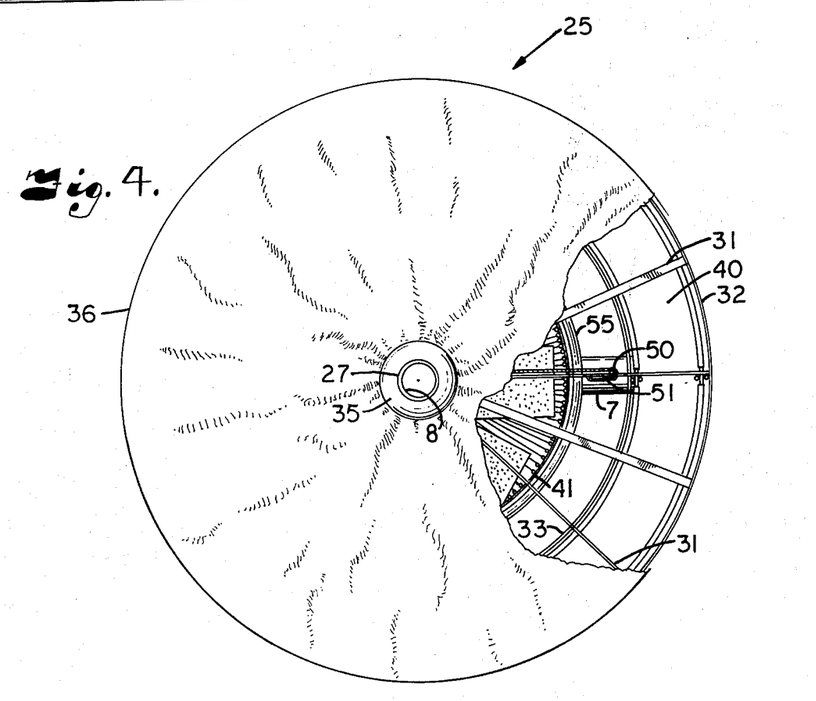
FIG. 4 is a top plan view of the other form of insecticide applicator and with portions broken away to better show the component parts.

FIGS. 3 and 4 illustrate an other form of an insecticide applicator 25 which includes a support structure substantially similar to the support structure illustrated in FIGS. 12 and 2 and includes a base 7 and an upright member 8.

The insecticide applicator 25 includes a hood support structure adapted to support a suitable hood, insecticide dispensing means, and a weather shield and in the illustrated structure, the upright member 8 and the hood structure are adapted to support the hood at a selected position above the ground or support surface 3. A sleeve 26 is mounted on and movable longitudinally of the upright member 8 and the sleeve 26 has an upper end 27 and a lower end 28. The sleeve is supported in a selected position on the upright member 8 by a collar 29 mounted on the upright member 8 and includes suitable means to secure the collar 29 in a selected position below the sleeve 26 to be engaged by the lower end 28 of the sleeve 26 and thereby support the sleeve 26 and the collar 29. One or more set screws 30 are mounted on the collar 29 and adapted to engage the upright member 8 to secure the collar 29 at a selected position along the upright member 8.

The hood support structure includes a plurality of rafters or hood support members 31 circumferentially spaced around the sleeve 26 and each having an upper end thereof suitably secured to the sleeve 26, as by welding. The rafters or hood support members 31 each extend outwardly and downwardly from adjacent the upper end 27 of the sleeve 26 and each have their respective lower ends secured to a peripheral edge member 32 which surrounds the sleeve 26 and the upright member 8.

The hood support structure also includes an inner support member 33 which surrounds the sleeve 26 and the upright member 8 and is spaced inwardly from the peripheral edge member 32. A plurality of struts or spacing members 34 are circumferentially spaced around the lower end 28 of the sleeve 26 and extend radially outwardly therefrom between the sleeve 26, the inner support member 33, and the peripheral edge member 32 thereby providing a substantially rigid structure for supporting the hood or weather shield.

A weather cap 35 is suitably mounted on the sleeve 26 adjacent the upper end 27 thereof and is positioned above the upper ends of the rafters or hood support members 31. The weather cap 35 is formed of a suitable weatherproof material, such as rubber, plastic, or the like, and is suitably bonded to the sleeve 26, as by adhesive, glue or the like.

The hood may be formed of any weatherproof material and in the illustrated structure, the hood is formed of a flexible weatherproof material, such as canvas, plastic, rubber or the like and has an upper portion thereof adapted to be mounted over the rafters or hood support members 31 and having an upper end adapted to be mounted between the weather cap 35 and the upper ends of the rafters or hood support members 31, as by a suitable drawstring. The hood is also illustrated as including a weather shield portion 36 depending from the upper or hood portion and having a lower hem 37 with a suitable weight, such as a wire or the like, therein to maintain the hem 37 in a lowered positioned and to retain same in a position surrounding the upright member 8.

The insecticide dispensing means may dispense insecticide dust or liquid and may be substantially the same device illustrated in FIGS. 1 and 2 and the insecticide dispensing means depend from the hood support structure and is illustrated as a container having one wall 38 depending from the peripheral edge member 32 and an other wall 39 depending from the inner support member 33. The one wall 38 is positioned adjacent the weather shield portion 36 and the illustrated container has a bottom portion 40 positioned above the lower hem 37 of the weather shield portion 36.

The insecticide applicator 25 also includes means supported on the upright member 8 and positioned below the hood for supporting a livestock attracting material in a selected position having a lower surface of the livestock attracting material positioned above the bottom portion 40 of the insecticide dispensing container whereby livestock must engage and activate the insecticide dispensing container to reach and have access to the livestock attracting material. The means for supporting and retaining the livestock attracting material are illustrated as a cage 41 having an open top.

In the illustrated structure, a sleeve 42 is mounted on and movable longitudinally of the upright member 8 and is positioned below the collar 29 and sleeve 26. An annular member 43 is mounted on the sleeve 42 adjacent a lower end thereof and the annular member 43 has a peripheral edge portion extending outwardly from the sleeve 42.

The annular member 43 provides support for a plurality of circumferentially spaced cage defining members 44 each having one end thereof secured to the annular member 43. The cage defining members 44 each have a base portion 45 extending radially outwardly from the annular member 43 and an upright portion 46 extending upwardly from the respective base portion 45. A top member 47 is secured to an upper end of each of the upright portions 46 of each of the cage defining members 44 thereby completing the upper edge of the cage 41 and defining an open top cage or receptacle 41.

The cage 41 is particularly adapted to support and retain a salt block. It is, therefore, desirable to provide sufficient space between the upright portions 46 and the adjacent or facing wall 39 of the insecticide container thereby substantially avoiding contact between the porous fabric and the salt. The livestock, therefore, will not receive salt from the porous fabric of the insecticide container and thereby will avoid contact with the salt about the face and eyes thereof.

An additional means to avoid contact between the salt and the eyes of the livestock is to form the wall 39 of the insecticide container of a non-porous material or canvas to thereby prevent salt from entering the insecticide container and thereby being applied to the face of the livestock. The non-porous material or canvas may depend from the bottom portion 40 of the insecticide container to form a drip ring and shield the salt block from moisture in the form of rain, snow, sleet and the like.

Means are mounted on the sleeve 26 and attached to the cage 41 for permitting adjustment of the vertical spacing between the bottom of the cage 41 and the bottom portion 40 of the insecticide material dispensing means. In the illustrated structure, spaced ears 48 are mounted on the sleeve 26 and extend outwardly therefrom and support a suitable pulley 49 which is adapted to direct movement of at least a portion of a flexible member 50 longitudinally of the upright member 8.

The sleeve 42 of the cage supporting member has means thereon to permit removable attachment of the flexible member 50 thereto whereby movement of the flexible member 50 longitudinally of the upright member 8 effects movement of the sleeve 42 longitudinally of the upright member 8. A suitable anchor for one end of the flexible member 50 is suitably secured to the sleeve 42 and is preferably in the plane of the top member 47. A suitable arm or anchor 51 is mounted on one of the struts or spacing members 34 and in alignment with the pulley 49. The arm or anchor 51 is adapted to have the flexible member 50 attached thereto.

A collar 52 is mounted on the upright member 8 and includes suitable means to secure the collar 52 in a selected position below the sleeve 42 of the cage support. In the illustrated structure, one or more set screws 53 are mounted on the collar 52 and adapted to engage the upright member 8 to secure the collar 52 at a selected position along the upright member 8 thereby supporting the sleeve 42 and the cage 41 and material therein.

Use of the insecticide applicator 25 illustrated in FIGS. 3 and 4 is substantially similar to use of the insecticide applicator 1 illustrated in FIGS. 1 and 2 except that the flexible weather shield may be raised to recharge the insecticide material dispensing means and to place mineral blocks, such as salt blocks, in the cage 41 all without removal of nuts, washers, and the like and without complete removal of the hood.

The insecticide applicator 1 illustrated in FIGS. 1 and 2 and the insecticide applicator 25 illustrated in FIGS. 3 and 4 each may include means to provide trace minerals and other material in the form of feed, medicine, and the like for the livestock. In the structure illustrated in FIGS. 3 and 4 a lower or second container 55 is sleeved on the upright member 8 and is maintained in a selected position relative to a ground surface and relative to the cage 41 by a collar 56 which is sleeved on the upright member 8 and is suitably secured in the selected position below the lower or second container 55 to thereby support same. One or more set screws are mounted on the collar 56 and adapted to engage the upright member 8 to secure the collar 56 at a selected position along the upright member 8.

Figure 5:
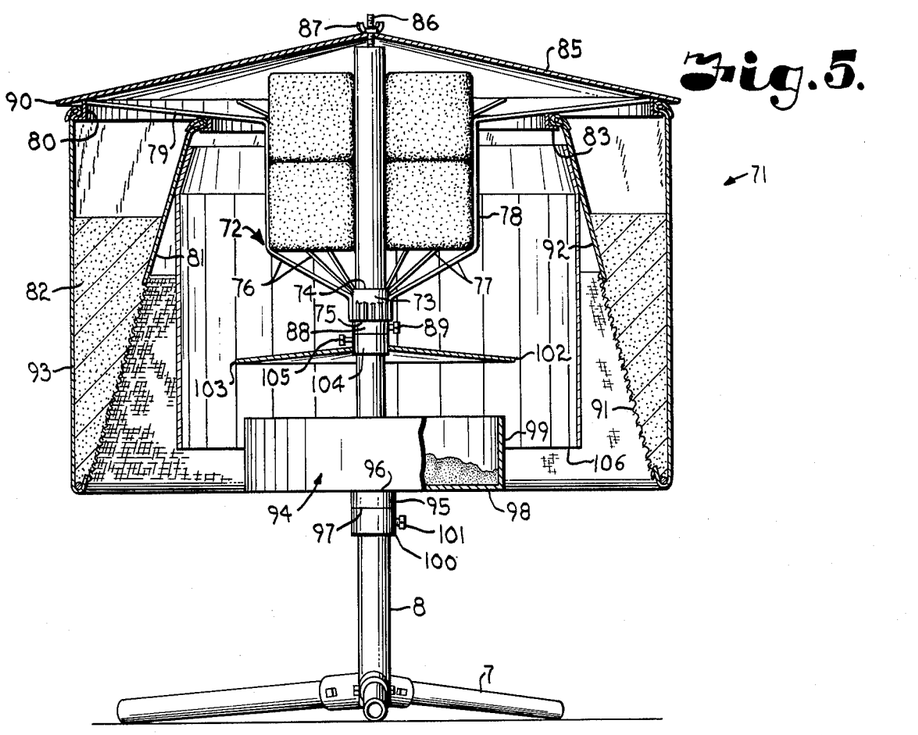
FIG. 5 is a side elevational view of an additional form of insecticide applicator and with portions broken away to better show the component parts.
Figure 6:
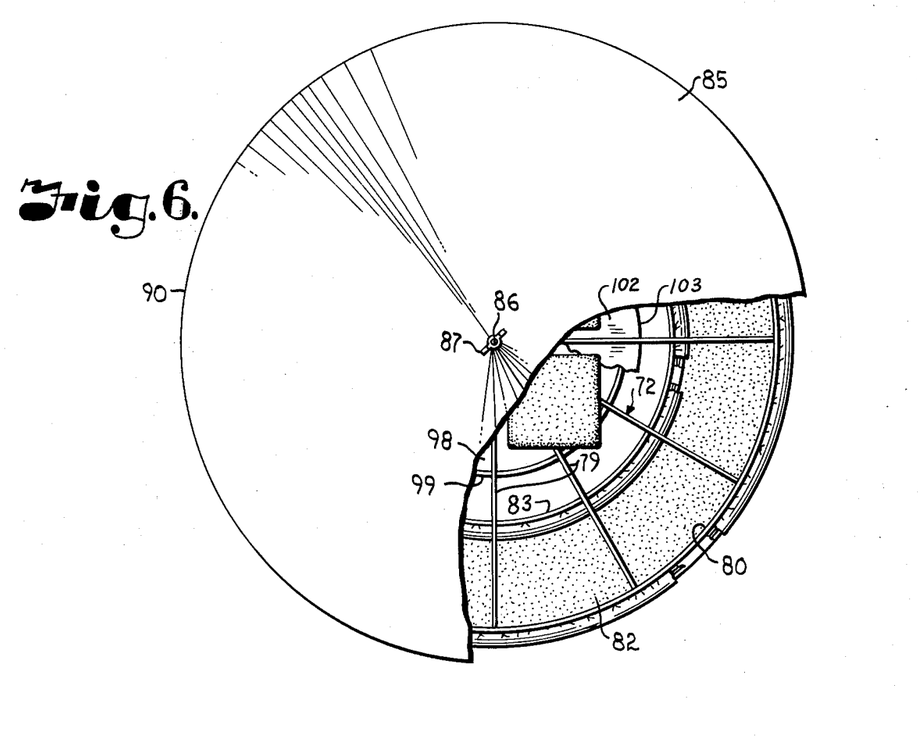
FIG. 6 is a top plan view of the additional form of insecticide applicator and with portions broken away to better show the component parts.

FIGS. 5 and 6 illustrate an additional form of insecticide applicator and feeder 71 which includes a support structure substantially similar to the support structure illustrated in FIGS. 1 to 4 inclusive and includes a base 7 and an upright member 8.

The insecticide applicator and feeder 71 includes a structure such as a cage 72 for supporting and retaining a livestock attracting material, such as a plurality of salt blocks, protein blocks, mineral blocks, and the like with suitable spaces in the structure for access by the animal's tongue to the material in the structure 72. The cage 72 has an open top to permit replacement of the blocks supported therein as blocks are consumed by livestock and the structure is shaped for gravitation of the blocks to the lower portion which has the access openings of diminishing width to retain small pieces as the animals use same.

In the illustrated structure, a sleeve member 73 is mounted on and movable longitudinally along the upright member 8 and the sleeve member 73 has an upper end 74 and a lower end 75. The cage 72 is formed of a plurality of circumferentially spaced cage defining members 76 and each have one end thereof secured to a lower portion of the sleeve member 73.

The cage defining members 76 each have a base portion 77 extending radially outwardly and upwardly from the lower end portion of the sleeve member 73 to define an inclined cage floor. The cage defining members 76 each have a side portion 78 extending upwardly from the respective base portion 77. The side portions 78 each have a length sufficient to permit a plurality of blocks to be vertically stacked in the cage 72. The cage defining members 76 each have a top portion 79 extending radially outwardly from the respective side portion 78. An annular edge or ring member 80 is secured to the free end of each top portion 79 of each of the cage defining members 76 thereby completing the cage structure 72 and forming a substantially rigid structure.

The cage 72 is an open top receptacle and is particularly adapted to support and retain therein a plurality of stacked salt blocks, mineral blocks, protein blocks, or the like to be consumed by livestock. It is, therefore, desirable to provide sufficient space between the side portion 78 of the cage defining members 76 and an adjacent or facing wall 81 of an insecticide container 82 thereby substantially avoiding contact between the insecticide container 82 and the salt blocks, mineral blocks, protein blocks, or the like.

The insecticide container 82 is supported on the top portions 79 of the cage 72 and in the illustrated structure, each of the top portions 79 have a hook or annular member 83 depending from a lower side of each of the top protions 79 and the hook 83 is positioned intermediate the side portions 78 and the annular edge member 80. The annular edge member 80 serves as an outer bumper for the insecticide container 82, as later described.

The cage 72 and the insecticide container 82 are covered by a hood 85 to provide weather protection for the animal attracting material within the cage 72 and the insecticide material within the container 82. The hood 85 may be mounted on the upright member 8 in any suitable manner. In the illustrated structure, a bolt or shaft 86 is suitably secured to the sleeve member 73 and extends upwardly beyond the upper end 74 thereof. The bolt or shaft 86 has the upper end thereof threaded to receive a suitable fastening device, such as a wing nut 87, to hold the hood in position overlying the insecticide container 82 and the cage 72.

The cage 72 is supported in a selected position on the upright member 8 by a collar 88 mounted on the upright member 8 and movable longitudinally therealong. The collar 88 includes suitable means to secure the collar 88 in a selected position below the sleeve member 73 of the cage 72 whereby the collar 88 will be engaged by the lower end 75 of the sleeve memver 73 and thereby support the sleeve member 73 and cage 72 on the collar 88. In the illustrated structure, one or more set screws 89 are mounted on the collar 88 and adapted to engage the upright member 8 to secure the collar 88 at a selected position along the upright member 8 whereby the collar 88 supports the cage 72, hood 85, and the insecticide container 82.

The hood 85 may be any desired shape and it is preferably higher at the center than at a peripheral edge 90 thereof which is spaced outwardly from the upright member 8 and preferably extends beyond the annular ring or edge member 80 of the cage 72. The hood 85 is illustrated as being a portion of a cone and the hood 85 is formed of any suitable waterproof material, such as metal, plastic, or the like, and is adapted to shed moisture including water, snow, and the like, from the insecticide applicator and feeder 71.

The insecticide applicator and feeder 71 includes the insecticide container 82 which is supported on the top portions 79 of the cage defining members 76. The insecticide container 82 is adapted to dispense a suitable insecticide material onto livestock in response to engagement of a bottom portion thereof by the livestock. The lower portion of the insecticide container 82 is positioned below a lower surface of the livestock attracting material within the cage 72 whereby livestock must engage the insecticide container 82 to reach and have access to the livestock attracting material.

The illustrated insecticide container 82 depends from the top portions 79 of the cage 72 and surrounds the upright member 8 and the cage 72 to thereby dispense the insecticide material onto livestock. While a container formed of flexible and porous fabric is illustrated, it is to be understood that any suitable means for dispensing insecticide material in the form of dust or liquid in response to activation, as by agitation thereof by livestock, may be employed in the insecticide applicator and feeder 71.

The wall 81 of the insecticide container 82 preferably has a lower portion 91 formed of a porous material, such as burlap, through which insecticide dust will pass when the bottom portion of the insecticide container 82 is engaged by livestock partaking of the material within the cage 72. The wall 81 includes an upper portion 92 formed of a non-porous material or canvas which extends from the top portions 79 of the cage defining members 76 to a position aligned with or below a lower surface of the material retained within the cage 72.

It is desirable to provide weather protection for the insecticide container 82, therefore, a flexible weather shield 93 forms a second or outer wall of the insecticide container 82 and is positioned inwardly from the peripheral edge 90 of the hood 85. The weather shield 93 and the lower portion 91 of the wall 81 are joined together at their respective lower edges to form a hem with a suitable weight enclosed therein, such as a wire, which will be lifted by the livestock when moving toward the livestock attracting material within the cage 72 whereby the livestock agitate the bottom portion of the container 82 thereby activating same to dispense the insecticide material through the porous lower portion 91 of the wall 81.

The insecticide container 82 is supported on and depends from the top portions 79 of the cage defining members 76. The upper edge portion of the weather shield 93 has a loop or hem for a drawstring engageable with the outer bumper or annular edge member 80 on the top portions 79 of the cage defining members 76. The upper portion 92 of the wall 81 has a loop or hem adjacent the upper edge thereof for a drawstring engageable with the hook or annular member 83 depending from the top portions 79 of the cage defining members 76 whereby the insecticide container 82 depends from the top portions 79 and assumes a generally triangular shape with an open top to permit placing additional insecticide material therein.

The insecticide applicator and feeder 71 includes means mounted on the upright member 8 for supporting and retaining a second livestock attracting material, such as granular mineral and vitamin materials. In the illustrated structure, a container 94 is mounted on the upright member 8 and is adapted to retain therein suitable granular material. The container 94 includes sleeve member 95 which is mounted on and movable longitudinally along the upright member 8. The sleeve member 95 has an upper end 96 and a lower end 97.

The illustrated container 94 includes a bottom wall 98 which is suitably secured to the sleeve member 95 at a position intermediate the ends thereof. The bottom wall 98 is illustrated as a solid member for retaining granular material, however, the bottom wall 98 may be formed of a reticulated or foraminous material permitting access thereto by small animals, such as calves and the like. The container 94 includes a side wall 99 extending upwardly from a peripheral edge of the bottom wall 98 to thereby define an open top container.

The container 94 may be positioned at any desired position along the upright member 8 and is suitably retained within a selected position above the support or ground surface 3. In the illustrated structure, a collar 100 is mounted on the upright member 8 and is movably longitudinally therealong and is positioned below the container 94. The collar 100 includes suitable means to secure the collar 100 in a selected position below the sleeve member 95 whereby the collar 100 will be engaged by the lower end 97 of the sleeve member 95 and thereby support the sleeve member 95 and container 94 on the collar 100. In the illustrated structure, one or more set screws 101 are mounted on the collar 100 and adapted to engage the upright member 8 to secure the collar 100 at a selected position along the upright member 8.

It is desirable to cover the container 94 to prevent mixing of insecticide with the material therein, therefore, a shield 102 is mounted on the upright member 8 and is spaced from and above the container 94. The spacing between the shield 102 and the container 94 is preferably a distance sufficient to permit livestock to reach and have access to the livestock attracting material within the container 94 while protecting the contents of the container 94 from insecticide material dispensed during engagement of the insecticide container 82 by the livestock.

The shield may be any suitable structure adapted to cover the container 94 and may be any desired shape and is also preferably higher at the center than at a peripheral edge 103 thereof which is preferably spaced outwardly of the side wall 99 of the container 94. The shield 102 is illustrated as being conical shaped and the shield 102 is preferably formed of any suitable impervious material, such as metal, plastic, or the like, which is adapted to shed moisture including water, snow, and the like from the container 94.

In the illustrated structure, an inner ring or sleeve 104 is mounted on the upright member 8 and positioned between the cage 72 and the container 94. The inner ring or sleeve 104 has an upper portion extending above the shield 102 and includes suitable means to secure the inner ring or sleeve 104 in a selected position above the container 94 and thereby support the shield 102 in a selected position. In the illustrated structure, one or more set screws 105 are mounted on the upper portion of the inner ring or sleeve 104 and adapted to engage the upright member 8 to secure the shield 102 at a selected position along the upright member 8 and above the container 94.

It is to be understood that the enticer and insecticide may include the insecticide applicator and only the enticer of the container 94 or the enticer of material in a cage 72 or may have the insecticide applicator with both enticers.

Use of the insecticide applicator and feeder 71 illustrated in FIGS. 5 and 6 is substantially similar to the use of the insecticide applicator 1 illustrated in FIGS. 1 and 2 and the insecticide applicator 25 illustrated in FIGS. 3 and 4 except that the hood 85 must be removed to recharge the insecticide material dispensing means and to place mineral blocks, such as salt blocks, protein blocks, and the like, in the cage 72.

Additional or alternate protection or shielding of the contents of the lower or second container 94 may be provided to prevent insecticide material or dust from entering the container 94 and contacting the contacts therein. A flexible shield 106 is secured to the upper portion 92 of the wall 81 of the insecticide container 82.

The flexible shield 106 preferably has a plurality of vertically extending slits to form a plurality of depending strips each having a lower end thereof extending below the top of the container 94. The flexible shield 106 is preferably formed of non-porous material and the depending strips thereof are easily moved aside by livestock seeking access to the material within the cage 72.

The material forming the weather shield 93 also has the porous lower portion 91 secured thereto, as best seen in FIG. 5, to form a reservoir for insecticide material that would prevent movement of insecticide material by wind and minimum contact with the insecticide container 82 by livestock to thereby prevent loss of material.

Figure 7:
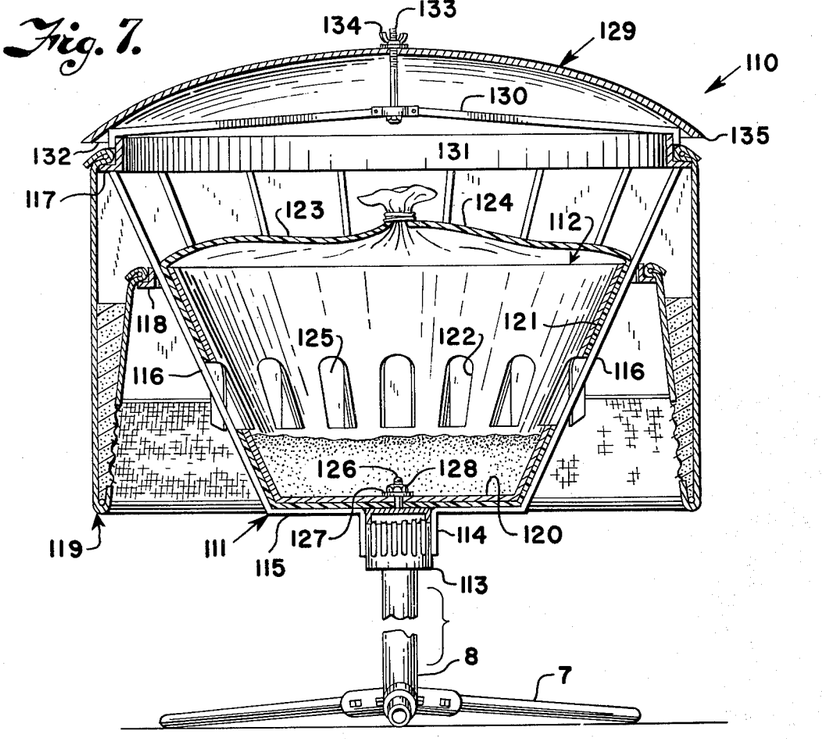
FIG. 7 is a side elevational view of a modified form of insecticide applicator and feeder and with portions broken away to better show the component parts.
Figure 8:
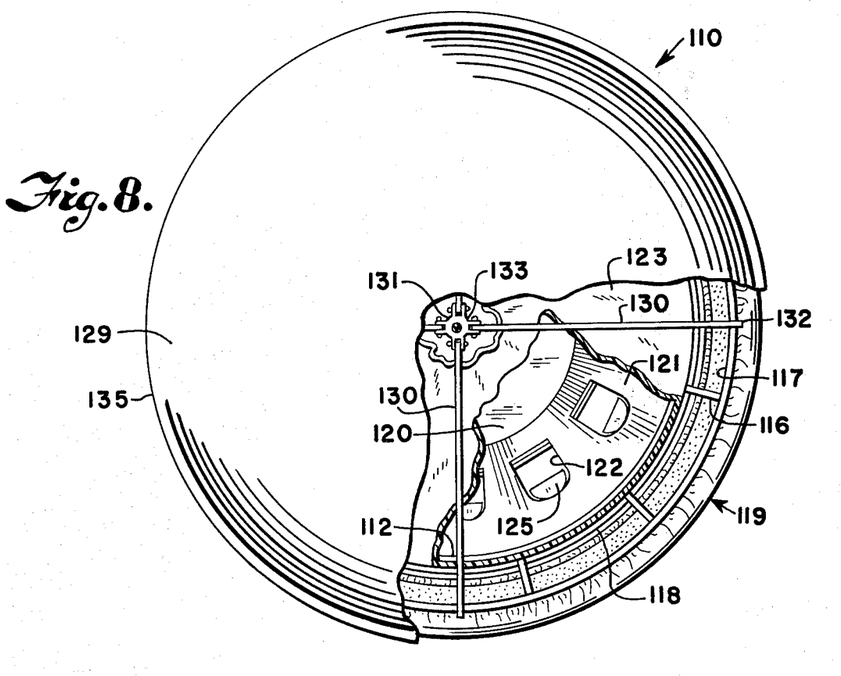
FIG. 8 is a top plan view of the modified form of insecticide applicator and feeder and with portions broken away to better show the component parts.

FIGS. 7 and 8 illustrate a modified form of insecticide applicator and feeder 110 which includes a support structure substantially similar to the support structure illustrated in FIGS. 1 to 6 inclusive and includes a base 7 and an upright member 8.

The support structure of the insecticide applicator and feeder 110 includes a structure, such as a cage 111, for supporting and retaining a container 112 adapted to contain a livestock attracting material, such as granular, mineral, and vitamin material in any desired physical form. The cage 111 and the container 112 are open top members to permit replacement of the material within the container 112.

In the illustrated structure, a cap member 113 is mounted on and engageable with the upper end of the upright member 8 to support the cage 111 and container 112. The cage 111 is formed of a plurality of circumferentially spaced cage defining members 114 with the spacing between the members 114 being such to provide access by an animal's tongue to the material in the container 112, as later described. The cage defining members 114 each have a lower end portion thereof suitably secured to the cap member 113, as by welding.

The cage defining members 114 each have a base portion 115 extending radially outwardly from the cap member 113 to define a base or floor for supporting the container 112. The cage defining members 114 each have a side portion 116 extending upwardly and outwardly from the respective base portion 115. An annular edge or ring member 117 is secured to the upper or free end of each of the side portions 116 of each of the cage defining members 114 thereby completing the cage 113 and forming a substantially rigid support structure. A lower ring member 118 is secured to the side portions 116 intermediate the ends thereof. The annular ring member 117 and the lower ring member 118 provide support for an insecticide container 119 in a manner substantially similar to that illustrated in FIG. 5.

The container 112 has a base wall 120 adapted to be supported on the base portions 115 of the cage defining members 114. The container 112 has a side wall 121 extending upwardly and outwardly from the base wall 120 and in engagement with the side portions 116 of the cage defining members 114. The side wall 121 of the container 112 has a plurality of circumferentially spaced apertures 122 positioned to permit access by the animal's tongue to the material within the container 112. The apertures 122 are preferably each positioned between an adjacent pair of the side portions 116 of the cage defining members 114.

It is particularly desirable to prevent mixing of insecticide material with the material within the container 112. Therefore, the container 112 is enclosed within a bag 123 which is adapted to be closed at the top thereof by a suitable tie 124 to provide a cover over the container 112. The bag 123 is slotted to provide suitable flaps 125 adapted to be aligned with the apertures 122 in the side wall 121 of the container 112. The flaps 125 permit access through the bag 123 to the materials within the container 112.

The cage 111, container 112, and bag 123 are preferably positioned on the upright member 8 to provide a stable structure. Therefore, a threaded stud 126 extends upwardly from the upper end of the upright member 8 and through the cap 113. A suitable washer 128 is sleeved on the stud 126 and the washer or retainer 127 is held in position by suitable nut 128.

The cage 111, container 112, insecticide container 119, and the bag 123 are covered by a hood 129 to provide weather protection for the animal attracting material within the container 112 and the insecticide material within the container 119. The hood 129 is removably mounted on the upper ring member 117 in any suitable manner. In the illustrated structure, a plurality of circumferentially spaced arms 130 extend radially from and are pivotally supported on a ring 131. The arms 130 each have an end portion 132 adapted to be moved into clamping engagement with the upper ring member 117 of the cage 111. A bolt or shaft 133 is suitably secured to the ring 131 and extends upwardly therefrom and through a suitable aperture in the hood 129. The shaft 133 has the upper end thereof threaded to receive a suitable fastening device, such as a wing nut 134, whereby tightening the wing nut 133 effects clamping engagement of the end portion 132 of the arms 130 with the annular ring member 117.

The hood 129 may be any desired shape and is preferably higher at the center than at a peripheral edge 135 thereof which is spaced outwardly from the upright member 8 and preferably extends beyond the annular ring member 117 of the cage 111. The hood 129 is illustrated as being a dome and the hood 129 is formed of any suitable waterproof material, such as metal, plastic, or the like, and is adapted to shed moisture including water, snow, ice, and the like, from the insecticide applicator and feeder 110.

The insecticide container 119 is substantially similar to the insecticide container 82 illustrated in FIGS. 5 and 6. A lower portion of the insecticide container 119 is positioned below the apertures 122 in the container 112 and the flaps 125 of the bag 123 whereby the livestock must engage the insecticide container 119 to reach and have access to the livestock attracting material within the container 112. An impervious shield is provided for the insecticide container 119 to protect the insecticide material from weather, as by a waterproof outer wall for the container 119.

While not illustrated, it is to be understood that the structure illustrated in FIGS. 7 and 8 may also include additional protection or shielding of the contents of the container 112 to prevent insecticide material or dust from entering the container 112 and contacting the contents therein. A flexible shield similar to the shield 106 may be secured to the insecticide container 119 in a manner similar to that illustrated in FIG. 5.

Use of the insecticide applicator and feeder 110 illustrated in FIGS. 7 and 8, is substantially similar to the use of the insecticide applicator 1, illustrated in FIGS. 1 and 2, the insecticide applicator 26 illustrated in FIGS. 3 and 4, and the insecticide applicator and feeder 71 illustrated in FIGS. 5 and 6. As in the insecticide applicator and feeder 71, illustrated in FIGS. 5 and 6, the hood 129 must be removed to recharge the insecticide container 119 and to place additional material within the container 112.

Figure 9:
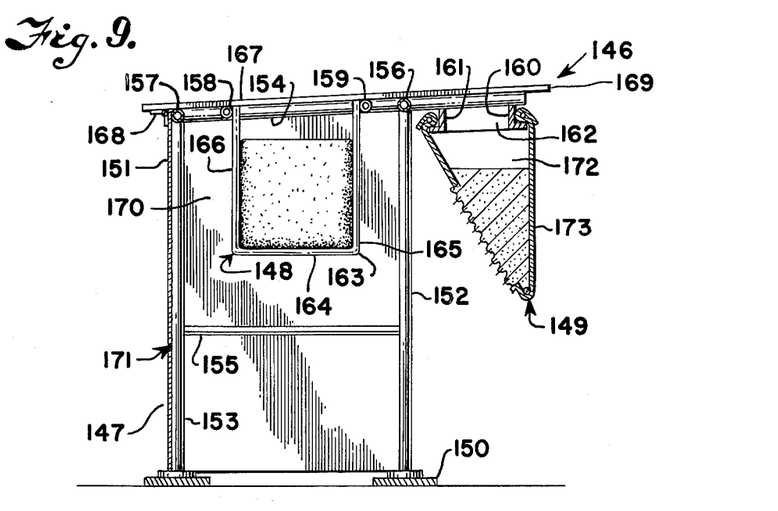
FIG. 9 is an end elevational view of a linear form of insecticide applicator and feeder and with portions broken away to better show the component parts.
Figure 10:
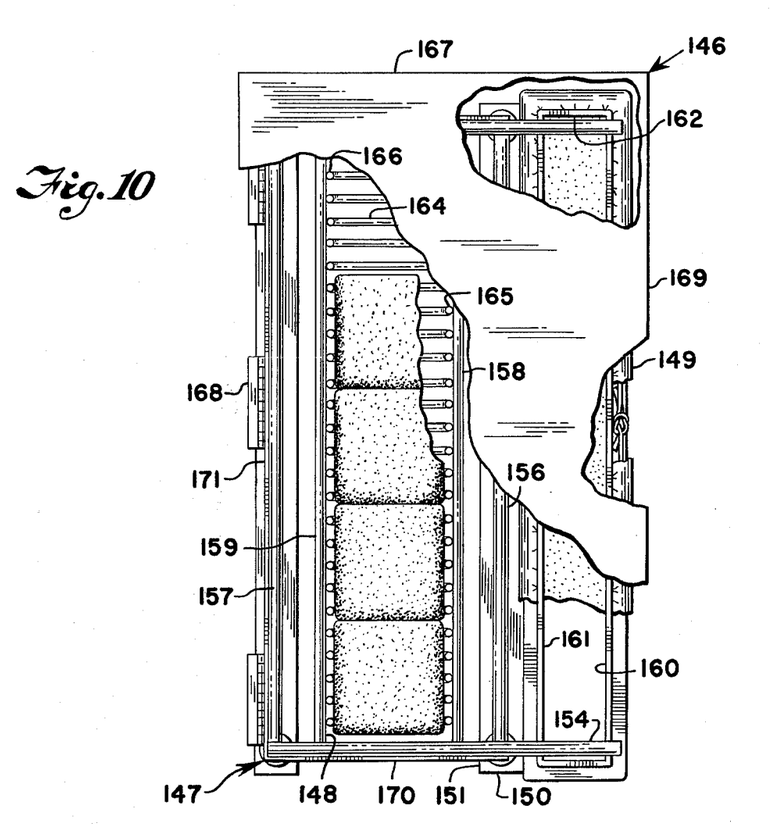
FIG. 10 is a top plan view of the linear form of insecticide applicator and feeder and with portions broken away to better show the component parts.

FIGS. 9 and 10 illustrate a linear form of insecticide applicator and feeder 146 which is supported on a frame 147 and includes a linear support structure, such as a cage 148, for supporting and retaining a livestock attracting material, such as a plurality of salt blocks, protein blocks, mineral blocks, and the like, with suitable spaces in the structure for access by the animal's tongue to the material within the cage 148. The insecticide applicator and feeder 146 includes a linear insecticide container 149 positioned substantially parallel with and spaced from the cage 148.

The frame 147 may be any suitable structure adapted to support the cage 148 and the insecticide container 149 and in the illustrated structure, the frame 147 includes a suitable base 150 and longitudinally spaced end frames 151 extending upwardly therefrom with the cage 148 and the insecticide container 149 extending between the end frames 151.

The end frames 151 are each formed of front and rear upright members 152 and 153 with a top member 154 mounted on the top of the upright members 152 and 153 and extending forwardly from the front upright member 152. The end frames 151 each preferably have suitable bracing members 155 extending between the upright members 152 and 153.

The frame 147 includes front and rear structural members 156 and 157 extending between the end frames 151 and having opposite ends thereof suitably secured to the respective top members 154 to provide a substantially rigid structure.

The frame 147 includes laterally spaced cage support members 158 and 159 extending between the top members 154 of the end frames 151. The frame 147 includes support means for the insecticide container 149 in the form of laterally spaced front and rear hangers 160 and 161 suitably supported on and extending between the forwardly extending portion of the top members 154. End hangers 162 extend between respective opposite ends of the front and rear hangers 160 and 161 adjacent the respective top members 154 of the end frames 151.

The cage 148 has an open top to permit replacement of the blocks supported therein as the blocks are consumed by livestock. In the illustrated structure, a plurality of longitudinally spaced cage defining members 163 are mounted on and depend from the cage support members 158 and 159. The illustrated cage defining members 163 are generally U-shaped and have a base portion 164 adapted to support a bottom surface of the mineral blocks within the cage 148. The cage defining members 163 each have opposite side portions 165 and 166 extending upwardly from respective opposite ends of the base portion 164 and having the upper ends thereof secured to the respective cage support members 158 and 159 respectively, as by welding. The longitudinal spacing between the cage defining members 163 is such to retain and support the mineral blocks and permit access thereto by the animal's tongue.

The cage 148 and the insecticide container 149 are suitably covered by a lid 167 to provide weather protection for the animal attracting material within the cage 148 and the insecticide material within the container 149. The lid 167 may be mounted on the frame 147 in any suitable manner. In the illustrated structure, a plurality of longitudinally spaced hinge members 168 have respective leaves thereof suitably secured to the lid 167 and to the rear structural member 157. The lid 167 has peripheral edge portions 169 extending beyond the cage 148 and the insecticide container 149 to thereby cover same. The lid 167 may be formed of any suitable waterproof material, such as metal, plastic or the like, and is adapted to shed moisture including water, snow, and the like, from the insecticide applicator and feeder 146.

It is desirable to enclose opposite ends and the rear of the frame 147 to thereby limit entry to the insecticide applicator and feeder 146 from the front portion thereof. Suitable end walls 170 and a rear wall 171 are suitably secured to the frame 147 thereby enclosing same and providing additional weather protection for the material within the cage 148.

The insecticide container 149 is substantially similar to the insecticide container illustrated in FIGS. 5 and 6 and the insecticide container 119 illustrated in FIGS. 7 and 8 except that the insecticide container 149 illustrated in FIGS. 9 and 10 is linear and has opposite end walls 172. The end walls 172 and a front wall 173 of the insecticide container 149 are preferably formed of a non-porous material or canvas which is substantially waterproof to provide an impervious shield for the container 149 to protect the contents from weather.

While a flexible shield similar to the shield 106 and a second or lower container for mineral and vitamin materials have not been illustrated in FIGS. 9 and 10, it is to be understood that such elements may be included in the insecticide applicator and feeder 146. A single bay has been illustrated, however, the insecticide applicator and feeder 146 may be any length by providing additional bays, as desired.

Use of the insecticide applicator and feeder 146 illustrated in FIGS. 9 and 10, is substantially similar to use of the insecticide applicators and feeders illustrated in FIGS. 1 to 8 inclusive, except that the livestock must enter the front portion of the insecticide applicator and feeder 146 and the lid 167 must be raised to recharge the insecticide container 149 and to replace mineral or salt blocks in the cage 148.

It is to be understood that while I have illustrated and described certain forms of my invention, it is not to be limited to these specific forms or arrangement of parts herein described and shown.

What I claim and desire to secure by Letters Patent is:

1. A combination insecticide applicator and feeder for livestock comprising:
   a. a support structure having an upright member;
   b. a hood;
   c. means on said hood and on said upright member to support said hood at a selected position above a ground surface;
   d. a container having insecticide material therein supported by said support structure adjacent to and below said hood, said container having a bottom portion thereof adopted to dispense insecticide material onto livestock in response to engagement of a bottom portion thereof by the livestock;

e. holding means supported on said upright member and positioned below said hood for supporting a livestock attracting material in spaced relation to said container;

f. means for retaining said holding means at a selected position having a lower surface of the livestock attracting material positioned above said bottom portion of said container whereby livestock must engage said bottom portion of said container to have access to the livestock attracting material; and g. a shield depending from said hood and positioned to protect the bottom portion of said container from weather.

2. A combination insecticide applicator and feeder as set forth in claim 1 including a second shield depending from said container and positioned between said container and said holding means to prevent intermingling of the insecticide material and the livestock attracting material.

3. A structure as set forth in claim 1 wherein:
a. said holding means for supporting the livestock attracting material comprises a cage having an open top;
b. the cage has a bottom formed of a plurality of circumferentially spaced members thereby permitting access to the livestock attracting material between the spaced members; and
c. means are mounted on said hood and attached to the cage for permitting adjustment of the vertical spacing between the bottom of said cage and the bottom portion of said insecticide material dispensing means.

4. A structure as set forth in claim 1 wherein:
a. said hood includes a sleeve movable longitudinally of said upright member and having opposite ends;
b. said means to support said hood includes a collar mounted on said upright member and means to secure said collar in a selected position below said sleeve to be engaged by one end of said sleeve and thereby support said hood;
c. said holding means for supporting the livestock attracting material comprises a cage having an open top; and
d. means are mounted on said sleeve of said hood and attached to the cage for permitting adjustment of the vertical spacing between a bottom of the cage and the bottom portion of said insecticide material dispensing container.

5. A structure as set forth in claim 1 wherein:
a. said hood includes a sleeve movable longitudinally of said upright member and having opposite ends;
b. said holding means for supporting a livestock attracting material includes a sleeve movable longitudinally of said upright member and positioned below the sleeve of said hood;
c. said means for retaining said holding means and a livestock attracting material therein at a selected position includes:
1. an elongated flexible member;
2. means mounted on said sleeve of said hood for directing movement of at least a portion of said flexible member longitudinally of said upright member; and
3. means mounted on said sleeve of said livestock attracting material holding means to permit removable attachment of said flexible member thereto whereby movement of said flexible member longitudinally of said upright member effects movement of said holding means supporting a livestock attracting material longitudinally of said upright member; and
d. said means for retaining said holding means and the livestock attracting material therein at a selected position includes a collar mounted on said upright member and means to secure said collar in a selected position below said sleeve of said holding means for supporting a livestock attracting material to be engaged by one end of said sleeve of said holding means.

6. A structure as set forth in claim 1 wherein:
a. said holding means for supporting a livestock attracting material includes:
1. a sleeve movable longitudinally of said upright member and positioned below said hood;
2. an annular member mounted on said sleeve and having a peripheral edge portion extending outwardly from said sleeve;
3. a plurality of circumferentially spaced cage defining members each having one end secured to said annular member, said cage defining members each having a base portion extending radially outwardly from said annular member and an upright portion extending upwardly from said base portion; and
4. a top member secured to an upper end of the upright portion of each of said cage defining members;
b. said means for retaining said holding means and a livestock attracting material therein at a selected location includes:
1. an elongated flexible member;
2. means mounted on said hood for directing movement of at least a portion of said flexible member longitudinally of said upright member;
3. means mounted on said sleeve of said holding means for supporting a livestock attracting material to permit removable attachment of said flexible member thereto whereby movement of said flexible member longitudinally of said upright member effects movement of said sleeve of said holding means longitudinally of said upright member; and
4. a collar mounted on said upright member and means to secure said collar in a selected position below said sleeve of said holding means, said collar being engaged by one end of said sleeve to thereby support and position said cage.

7. A structure as set forth in claim 1 wherein said means to support said hood at a selected position includes:
a. a sleeve movable longitudinally of said upright member;
b. a collar mounted on said upright member and means to secure said collar in a selected position below said sleeve to thereby support said sleeve thereon;
c. a plurality of circumferentially spaced arms extending upwardly and outwardly from said sleeve, each of said arms having an upper end, said arms being spaced apart a distance sufficient to permit a head of livestock to extend therebetween;
d. a wall member above said arms and secured to the upper ends thereof; and
e. means secured to said wall member and in engagement with said hood to hold said hood in engagement with said wall member.

8. A structure as set forth in claim 7 wherein:
   a. said holding means for supporting a livestock attracting material comprises a basket formed of a fabric net and having an upper portion thereof supported on said wall member; and
   b. said basket depends from said wall member and has a portion thereof positioned within a space defined by said upwardly and outwardly extending arms.

9. A livestock feeder as set forth in claim 1 wherein:
   a. said support structure includes a cage having a plurality of circumferentially spaced cage defining members each having a base portion and an upright portion;
   b. said holding means for supporting and retaining a livestock attracting material comprises an attracting material container positioned within said cage and having a base wall and a side wall in engagement with said base portions and said upright portions respectively of said cage defining members; and
   c. said side wall of said attracting material container has a plurality of circumferentially spaced apertures therein positioned to provide access by an animal's tongue to material within said attracting material container.

10. A livestock feeder as set forth in claim 9 including a bag positioned within said cage and enclosing said attracting material container and having an open top adapted to be closed to cover said attracting material container, said bag being slotted to provide a plurality of circumferentially spaced flaps each aligned with a respective one of said apertures in said side wall of said attracting material container to provide access through said bag by an animal's tongue to material within said attracting material container.

11. A combination insecticide applicator and feeder for livestock comprising:
   a. a support structure having a base and an upright member extending upwardly therefrom;
   b. a hood having a peripheral edge spaced outwardly from said upright member;
   c. means on said hood and on said upright member to support said hood at a selected position above a ground surface;
   d. a container depending from said hood and surrounding said upright member and having insecticide material therein, said container having a bottom portion thereof adapted to dispense insecticide material onto livestock in response to engagement of the bottom portion of said insecticide material dispensing container by the livestock, said insecticide material dispensing container being positioned between said upright member and the peripheral edge of said hood;
   e. a flexible weather shield depending from the peripheral edge of said hood and surrounding said insecticide material dispensing container and having a lower edge positioned below the bottom portion of said insecticide material dispensing container;
   f. holding means supported on said upright member and positioned below said hood for supporting a livestock attracting material; and
   g. means for retaining said holding means at a selected position having a lower surface of the livestock attracting material positioned above said insecticide material dispensing container whereby livestock must engage the insecticide material dispensing container to have access to the livestock attracting material, said livestock attracting material being surrounded by said insecticide material dispensing container.

12. A structure as set forth in claim 11 wherein:
   a. said means to support said hood at a selected position includes:
      1. a sleeve movable longitudinally of said upright member, said sleeve having a lower end and an upper end;
      2. a collar mounted on said upright member and means to secure said collar in a selected position below said sleeve to be engaged by the lower end thereof and thereby support said sleeve thereon;
      3. a plurality of circumferentially spaced arms extending upwardly and outwardly from said sleeve, each of said arms having an upper end, said arms being spaced apart a distance sufficient to permit a head of livestock to extend therebetween, said arms each having an upper portion positioned adjacent said insecticide material dispensing container;
      4. a wall member above said arms and secured to the upper end thereof;
      5. a plurality of circumferentially spaced and radially extending support members each having one end secured to said wall member and extending outwardly therefrom; and
      6. means secured to said wall member and in engagement with said hood to hold same in engagement with said wall member and in engagement with said support members;
   b. said holding means for supporting livestock attracting material comprises a basket formed of a fabric net and having an upper portion thereof supported on said wall member; and
   c. said basket depends from said wall member and has a lower portion thereof positioned within a space defined by said upwardly and outwardly extending arms.

13. A structure as set forth in claim 11 wherein:
   a. said holding means for supporting a livestock attracting material includes:
      1. a sleeve movable longitudinally of said upright member and positioned below said hood, said sleeve having a lower end and an upper end;
      2. an annular member mounted on said sleeve and having a peripheral edge portion extending outwardly from said sleeve;
      3. a plurality of circumferentially spaced cage defining members each having one end secured to said annular member, said cage defining members each having a base portion extending radially outwardly from said annular member and an upright portion extending upwardly from said base portion; and
      4. a top member secured to an upper end of the upright portion of each of said cage defining members; and
   b. said means for retaining said holding means and a livestock attracting material therein at a selected location includes:
      1. an elongated flexible member;
      2. means mounted on said hood for directing movement of at least a portion of said flexible member longitudinally of said upright member;

3. means mounted on said sleeve of said livestock attracting material supporting holding means to permit removable attachment of said flexible member thereto whereby movement of said flexible member longitudinally of said upright member effects movement of said sleeve of said holding means longitudinally of said upright member; and
4. a collar mounted on said upright member and means to secure said collar in a selected position below said sleeve of said livestock attracting material holding means, said collar being engaged by one end of said sleeve to thereby support and position said cage relative to the bottom portion of said insecticide material dispensing container.

14. A combination insecticide applicator and feeder for livestock comprising:
a. a support structure having an upright member;
b. a cage mounted on said upright member for supporting and retaining a livestock attracting material, said cage having a plurality of spaced members which converge downwardly and inwardly for gravitation of material as it is reduced in size and permit continued access thereto by animals;
c. a hood;
d. means for mounting said hood on said upright member and in a position above said cage for supporting and retaining a livestock attracting material and in a position overlying same;
e. a container supported on said cage for supporting and retaining a livestock attracting material, said container having a bottom portion thereof adapted to dispense insecticide material onto livestock in response to engagement of the bottom portion thereof by the livestock, said container for dispensing insecticide material onto livestock having the bottom portion thereof positioned below a lower surface of the livestock attracting material whereby livestock must engage said bottom portion of said container to have access to the livestock attracting material; and
f. a shield depending from said hood and positioned to protect the bottom portion of said container from weather.

15. A structure as set forth in claim 14 wherein:
a. said cage includes a sleeve member having an upper end and being mounted on said upright member and having one end of each of said spaced members mounted thereon and extending therefrom;
b. said hood is removably supported on said upper end of said sleeve member;
c. said spaced members of said cage each have an outwardly extending portion each extending beyond said cage; and
d. said container for dispensing insecticide material onto livestock is removably supported on said outwardly extending portions and depends therefrom and surrounds said cage.

16. A structure as set forth in claim 14 including:
a. holding means mounted on said upright member for supporting and retaining a second livestock attracting material, said holding means for supporting and retaining a second livestock attracting material being below said cage for supporting and retaining the first named livestock attracting material;
b. a second hood; and
c. means for mounting said second hood on said upright member and in a position spaced from and above said holding means for supporting and retaining a second livestock attracting material, the spacing between said second hood and said holding means for the second livestock attracting material being a distance to permit livestock to reach and have access to the second livestock attracting material while protecting same from insecticide material dispensed during engagement of said bottom portion of said container.

17. A livestock feeder comprising:
a. a support structure;
b. means supported on said support structure for supporting and retaining a livestock attracting material;
c. an impervious shield mounted on said support structure and spaced from said means for supporting and retaining a livestock attracting material;
d. a hood;
e. means engaging said hood and said support structure for removably mounting said hood at a selected position above a ground surface and in covering relation with said means for supporting and retaining a livestock attracting material;
f. an insecticide container having insecticide material therein and supported on said support structure and spaced from said means for supporting and retaining a livestock attracting material, said insecticide container having a bottom portion adapted to dispense insecticide material onto livestock in response to engagement of the bottom portion thereof by the livestock, said insecticide container bottom portion being formed of porous material, said insecticide container having an outwardly facing wall portion; and
g. said impervious shield being positioned and adapted to protect the insecticide material from weather.

18. A livestock feeder as set forth in claim 17 including a second shield depending from said insecticide container and positioned between said insecticide container and said cage to prevent intermingling of the insecticide material and the livestock attracting material.

19. A livestock feeder comprising:
a. a support structure;
b. means supported on said support structure for supporting and retaining a livestock attracting material;
c. an impervious shield mounted on said support structure and spaced from said means for supporting and retaining a livestock attracting material;
d. a hood;
e. means engaging said hood and said support structure for removably mounting said hood at a selected position above a ground surface and in covering relation with said means for supporting and retaining a livestock attracting material;
f. an insecticide container having insecticide material therein mounted on said support structure below said hood and spaced from said means supporting and retaining a livestock attracting material, said insecticide container having a bottom portion thereof adapted to dispense insecticide material onto livestock in response to engagement of the bottom portion thereof by the livestock;

g. holding means mounted on said support structure for supporting and retaining a second livestock attracting material, said holding means being below said first named means for supporting and retaining the first named livestock attracting material;

h. a second hood; and i. means for mounting said second hood on said support structure and in a position spaced from and above said holding means for supporting and retaining a second livestock attracting material, the spacing between said second hood and said holding means for the second livestock attracting material being a distance to permit livestock to reach and have access to the second livestock attracting material while protecting same from insecticide material dispensed during engagement of said bottom portion of said insecticide container.

* * * * *